Oct. 31, 1950     V. F. WALTERS     2,528,461
IMPLEMENT TOWING HITCH
Filed Nov. 28, 1949     2 Sheets-Sheet 1
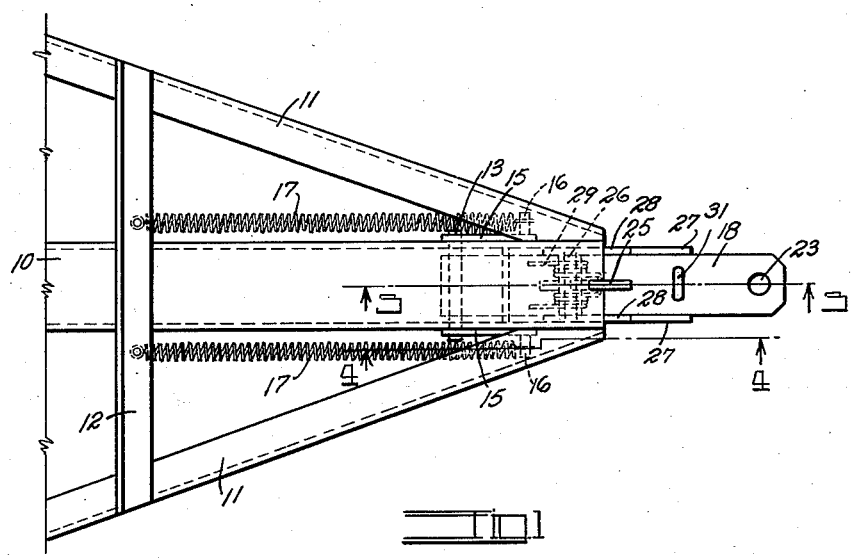
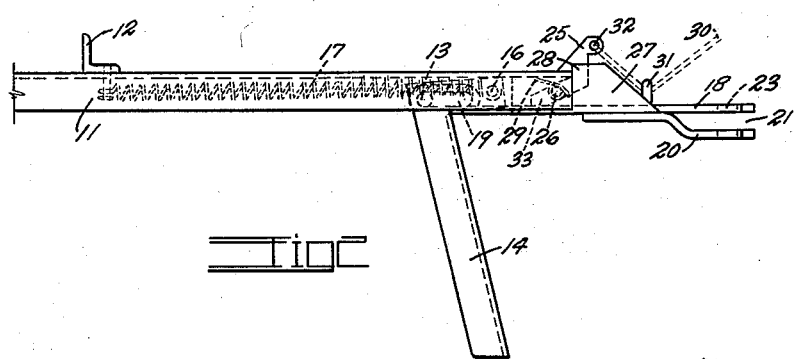
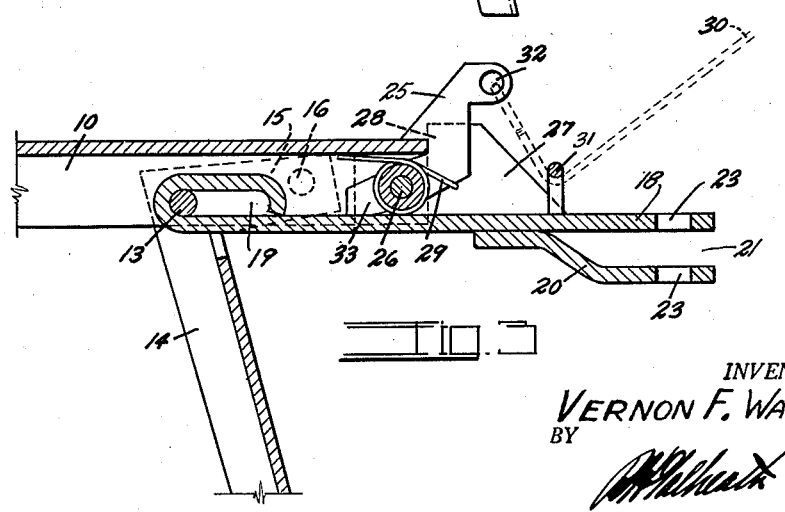
INVENTOR.
VERNON F. WALTERS
BY
ATTORNEY

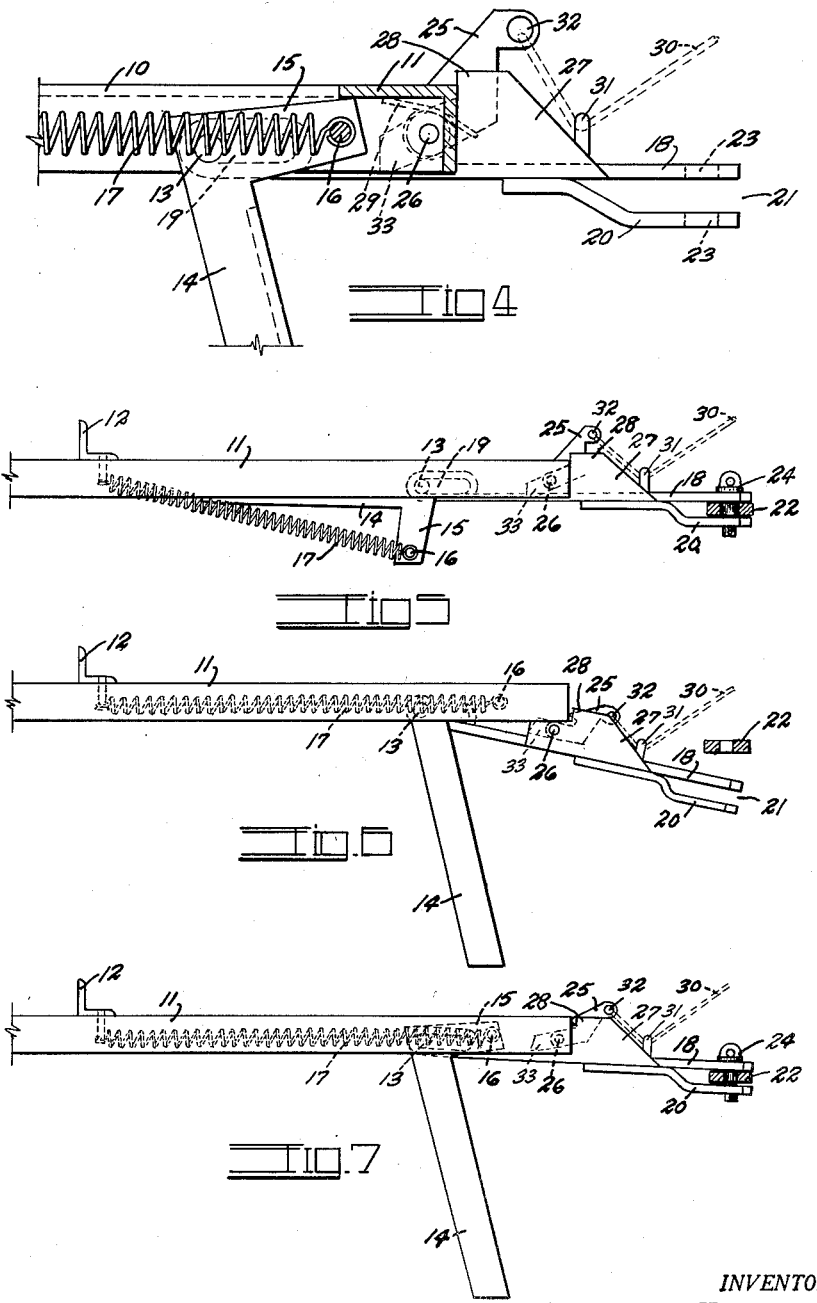

Patented Oct. 31, 1950

2,528,461

UNITED STATES PATENT OFFICE 2,528,461

IMPLEMENT TOWING HITCH

Vernon F. Walters, Denver, Colo., assignor to Howry-Berg Steel & Iron Works, Denver, Colo., a corporation of Colorado Application November 28, 1949, Serial No. 129,807

3 Claims. (Cl. 280—33.44)

This invention relates to an implement hitch for attaching implements and trailers to tractors and tow cars. The principal object of the invention is to provide a hitch construction which will enable a single man to attach a heavy implement to the tractor without assistance and without the use of jacks or other lifting equipment.

It is exceedingly difficult for the driver of a tractor to back the tractor into position for hitching it to a heavy implement or trailer with sufficient accuracy to allow the draw bar pin to be placed in position. Another object of this invention is to provide means whereby the tongue of the implement will be supported in approximate position for attachment; to provide a hitch device on the tongue which can be raised, lowered, and moved in various directions to enable the operator to position it to receive the draw bar pin; and to provide a hitch of this character which, after its attachment to the trailer, will automatically assume the proper trailing position in consequence of the tractor being driven forwardly.

A further object is to provide a supporting leg for implement tongues which can be placed in or removed from position by simply driving the tractor forward and back.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a plan view of the improved implement hitch in position on the tongue of a typical implement or trailer;

Fig. 2 is a side view thereof;

Fig. 3 is an enlarged, longitudinal section, taken on the line 3—3, Fig. 1;

Fig. 4 is a similar section, taken on the line 4—4, Fig. 1; and

Figs. 5, 6, and 7 are side views of the improved hitch, illustrating it in various positions, to be later described.

In the drawing, a tongue of a trailing implement is illustrated at 10, with its side braces 11 and a cross bar 12. The tongue is channel shaped in cross-section, with its two side flanges directed downwardly.

A hinge pin 13 is extended transversely through the two side flanges of the channel tongue 10. A channel-shaped leg member 14 is hingedly mounted on the extremities of the pin 13 at each side of the tongue 10 so that the leg member may swing rearwardly and upwardly beneath and along each side of the latter.

The leg 14 is provided with two hinge arms 15, there being one of the arms 15 positioned at each side of the tongue 10. When the leg is in the supporting position of Fig. 2, the hinge arms 15 extend forwardly, as shown in Fig. 4. The amount of forward swing of the leg 14 is limited by the contact of these arms with the angle braces 11 or other stop means, as shown in Fig. 4.

A spring pin 16 projects outwardly from each hinge arm 15, and a tension spring 17 extends rearwardly from each of the spring pins 16 to a connection with the cross bar 12. It will be noted that when the leg 14 is in the supporting position of Fig. 2, the spring pin 16 is slightly above the axis of the hinge pin 13, so that the action of the tension in the springs is to lift the forward extremities of the spring arms and force the leg 14 forwardly. If the leg 14 be swung slightly rearward, or if the tongue 10 be moved slightly forward, the center line of the springs will move below the axis of the pin 13, causing the springs to snap the leg 14 rearwardly and upwardly to the position of Fig. 5.

A flat, elongated draft bar 18 is mounted in the forward extremity of the channel of the tongue 10. The rearward extremity of the draft bar 18 is bent back upon itself to form an elongated loop 19 surrounding the hinge pin 13. A lower member 20 is welded or otherwise secured to the forward extremity of the draft bar 18 to form an open notch 21 to receive the draw bar of the towing tractor, indicated at 22 in Figs. 6 and 7. The members 18 and 20 are drilled to provide draw bar pin openings 23 for receiving the draw bar pin 24.

The draft bar 18 is supported in the forward extremity of the tongue 10 by means of a hooked latch member 25 having an inclined rearward face and a notch for receiving the upper portion of the tongue 10. The latch 25 is mounted on a latch pin 26 extending between side plates 27 welded or otherwise secured to the sides of the bar 18.

The rearward extremities of the side plates 27 extend into the forward extremity of the tongue 10, and these side plates are provided with shoulders 28 which contact the end of the tongue 10 to limit the rearward movement of the draft bar 18 when the latch is engaged.

A latch spring 29 constantly urges the latch to the engaged position. It may be withdrawn from the engaged position by means of a flexible cable 30 extending to any point convenient to the driver of the tractor. The cable extends under a cable loop 31 on the draft bar 18 to a cable eye 32 on the latch 25. The latch is prevented from swinging too far rearwardly by means of a foot portion 33 formed thereon which contacts the bar 18.

Let us assume that the implement is being supported upon the leg 14, and that the tractor has been backed to position the draw bar 22 substantially as shown in Fig. 6. The driver now dismounts and raises the draft bar 18, moving it rearwardly if necessary, the loop 19 riding over the pin 13, and slides it over the pin hole in the draw bar 22, as shown in Fig. 7. He now puts the draw bar pin 24 in place and returns to his driver's seat.

When the tractor is driven forwardly, the upper extremity of the leg 14 will swing forwardly, allowing the forward extremity of the tongue 10 to descend until the side plates 27 rest against the top plate of the tongue and the latch 25 snaps thereover. This places the load of the implement on the draw bar 22 and relieves the load on the leg 14, allowing the springs 17 to snap the leg upwardly to the traveling position of Fig. 5.

Should the driver desire to release the implement, he simply forces the leg 14 downwardly against the ground, thence returns to his tractor, releases the latch member 25, and backs the tractor until the springs 17 pass their dead-center position and the leg is in the supporting position of Fig. 6. The releasing of the latch 25 allows the tongue 10 to rise without tending to lift the tractor draw bar. The draw bar 24 can now be withdrawn and the tractor driven away.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hitch for attaching implements to the draw bar of a tractor comprising: an implement tongue; a draft bar; means for securing said draft bar to the draw bar; a transversely extending hinge pin hinging said draft bar to the forward extremity of said tongue; and releasable means for supporting said draft bar in vertical alignment with said tongue, the hinge of said draft bar allowing relative longitudinal movement between said tongue and said draft bar when said releasable means is released.

2. A hitch for attaching implements to the draw bar of a tractor comprising: an implement tongue; a draft bar; means for securing said draft bar to the draw bar; a transversely extending hinge pin hinging said draft bar to the forward evtremity of said tongue; releasable means for supporting said draft bar in vertical alignment with said tongue, the hinge of said draft bar allowing relative longitudinal movement between said tongue and said draft bar when said releasable means is released; and means for preventing rearward movement of said draft bar when the latter is in vertical alignment with said tongue.

3. A hitch for attaching implements to the draw bar of a tractor comprising: an implement tongue; a draft bar; means for securing said draft bar to the draw bar; a transversely extending hinge pin hinging said draft bar to the forward extremity of said tongue; side plates formed on said draft bar, said side plates extending into said tongue and limiting the upward movement of said draft bar; a shoulder portion formed on said side plates and adapted to contact the forward extremity of said tongue to limit the rearward movement of said draft bar; a latch pin extending between said side plates; and a latch mounted on said pin and adapted to engage the top of said tongue to support said draft bar therein.

VERNON F. WALTERS.

REFERENCES CITED

The following references are of record in the file of this patent:

UNITED STATES PATENTS

| Number | Name | Date |
|---|---|---|
| 2,400,145 | Zink et al. | May 14, 1946 |

FOREIGN PATENTS

| Number | Country | Date |
|---|---|---|
| 548,564 | Germany | Apr. 19, 1932 |